United States Patent [19]

LeTarte

[11] Patent Number: 4,556,374
[45] Date of Patent: Dec. 3, 1985

[54] PURGING DEVICE FOR A FILLER CARRIER

[76] Inventor: Walter G. LeTarte, 2040 Emerson Rd., Goodells, Mich. 48027

[21] Appl. No.: 656,480

[22] Filed: Oct. 1, 1984

[51] Int. Cl.$^4$ .......................... B29C 5/00; B29D 7/02; B29D 31/00
[52] U.S. Cl. ................................... 425/114; 141/87; 198/722; 425/215; 425/817 R
[58] Field of Search ............... 198/722; 141/172, 275, 141/280, 148, 253, 115, 122, 123, 86, 87, 88; 425/4 R, 110, 114, 817 R, 215, 216, 217, 256, 261

[56] References Cited

U.S. PATENT DOCUMENTS

| | | | |
|---|---|---|---|
| 1,675,741 | 7/1928 | Waring | 141/87 |
| 1,857,915 | 5/1932 | Kirshner | 141/172 |
| 3,107,703 | 10/1963 | Smith | 141/86 |
| 3,369,576 | 2/1968 | Pinto | 141/86 |
| 3,601,854 | 8/1971 | Trueblood | 425/215 |
| 3,610,391 | 10/1971 | Beck | 198/722 |
| 3,881,589 | 5/1971 | Peddinghaus | 198/722 |
| 4,381,907 | 5/1983 | Bischlipp et al. | 264/46.7 |

Primary Examiner—Willard E. Hoag
Attorney, Agent, or Firm—Basile, Weintraub & Hanlon

[57] ABSTRACT

A filler carrier of the type adapted to move metal extrusions in a generally horizontal plane beneath the dispensing nozzle of a machine for dispensing uncured liquid plastic is disclosed. Uncured liquid plastic is dispensed into a channel of the extrusion which is subsequently cut so as to form a thermal barrier between the remaining sections of the extrusion which remain coupled by means of the cured plastic material. The filler carrier is provided with a mechanically driven conduit that is movable between a first lowered position that permits the passage thereover of the extrusion, to a second raised position wherein an upper opening of the movable conduit receives the nozzle of the dispensing machine so that uncured liquid plastic from the machine and any subsequent flushing solvent passing therethrough may be collected and transferred to an appropriate container in a clean and simple fashion.

3 Claims, 4 Drawing Figures

PURGING DEVICE FOR A FILLER CARRIER

BACKGROUND OF THE INVENTION

I. Field of the Invention

The present invention relates to carriers for filling cavities in aluminum extrusions with a thermal barrier material and, in particular, to a purging station associated with the nozzle injecting the barrier material.

II. Description of the Prior Art

Heretofore it has been known to feed lengths of aluminum extrusions of various sizes and shapes through an apparatus known as a filler carrier which is adapted to position the extrusion adjacent the nozzle of a plastic mixing and dispensing machine which will dispense measured amounts of uncured liquid plastic into a designated channel in the extrusion when the extrusion is beneath the nozzle. The plastic mixing and dispensing machines are generally of the type which have a two-component system for dispensing a urethane material in which the material is first mixed in a mixing chamber and then ejected under pressure through a nozzle into the designated channel of the extrusion as the extrusion is passed by the nozzle. Generally, such urethane thermal barrier materials solidify shortly after they have been mixed and injected into the channel of the extrusion. Generally the plastic will cure within ten seconds after the uncured liquid plastic has been ejected from the dispensing machine. Once the extrusion channel has been filled and the extrusion has passed by the nozzle, the dispensing machine must be kept operative so as to prevent the solidification or curing of the liquid plastic within the mixing chamber and dispensing nozzles thereof.

It is customary in such dispensing machines to first stop the flow of the plastic material upstream of the mixing chamber while the remaining material is ejected under pressure from the nozzle. Subsequent to ejection of the uncured liquid plastic, the mixing chamber and conduits from the mixing chamber to the nozzle are then flushed with a suitable chemical solvent. The solvent flush is then followed by a compressed air purge which insures that the mixing chamber, conduits and nozzle have been cleared of both the plastic material and solvent.

Because of the high monetary value of the mixing chamber of such dispensing machines, it is necessary to maintain the flow of the uncured plastic therethrough until the machine can be set up to insure that the flow of plastic can be terminated at a point upstream of the mixing chamber and that the flushing operation is operative and will properly function. This results in the dispersion of a considerable amount of the uncured plastic which is wasted and results in an unnecessary waste of money as the plastic is relatively expensive.

Unless some means are provided, the flushing operation of the solvent and pressurized air results in a considerable spraying of the work area. In particular, the surface area and related mechanical components of the filler carrier are exposed to the solvent and uncured plastic. This creates a very dirty environment which not only can cause damage to the machinery but delays their further subsequent use because a clean-up operation must be performed before new extrusions can be processed through the filler carrier.

It would therefore be desirable to provide a filler carrier and dispersing machine that can be operated in conjunction with each other and in which the dispersing machine can be switched from a plastic dispensing mode to a flushing mode in the shortest possible time without the heretofore problems of having waste materials sprayed upon machinery equipment, extrusions and personnel.

SUMMARY OF THE INVENTION

The present invention, which will be described subsequently in greater detail, comprises a purging device adapted for use with a filler carrier. The filler carrier is of the type that feeds an aluminum extrusion past a nozzle in timed relationship to the dispensation of measured amounts of uncured liquid plastic from the nozzle into a designated channel in the extrusion.

Upon passage of the extrusion past the nozzle of the dispensing machine, a movable conduit of the purging device is raised to receive the nozzle whereupon the dispensing device is cycled through a flush mode and the dispensed liquid plastic and solvent flush are received within the conduit. The conduit is movable between a first normally stored position wherein its upper opening is disposed below and out of the way of the moving extrusion to a second raised position wherein the conduit opening receives the nozzle of the dispensing machine. Suitable means operable in response to appropriate actuation is adapted to move the conduit between the raised and lowered positions.

It is therefore an object of the present invention to provide a purging device for use in conjunction with filler carriers of the type that are adapted to feed lengths of aluminum extrusion past the nozzle of a plastic mixing and dispensing machine.

A further object of the present invention is to provide such a purging device which will permit the rapid positioning of the purging conduit around the dispensing machine nozzle so as to accelerate the time in which the plastic mixing and dispensing machine may be flushed after use.

A further object of the present invention is to provide such a purging device which is simple in its design and construction and which is easy for the machine operators to utilize, yet one which is inexpensive to manufacture and install on both new and previously manufactured filler carriers.

Other objects, advantages and applications of the present invention will become apparent to those skilled in the art of filler carriers and plastic mixing and dispensing machines when the accompanying description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views and wherein.

DESCRIPTION OF THE PREFERRED EMBODIMENT

Figure 1:
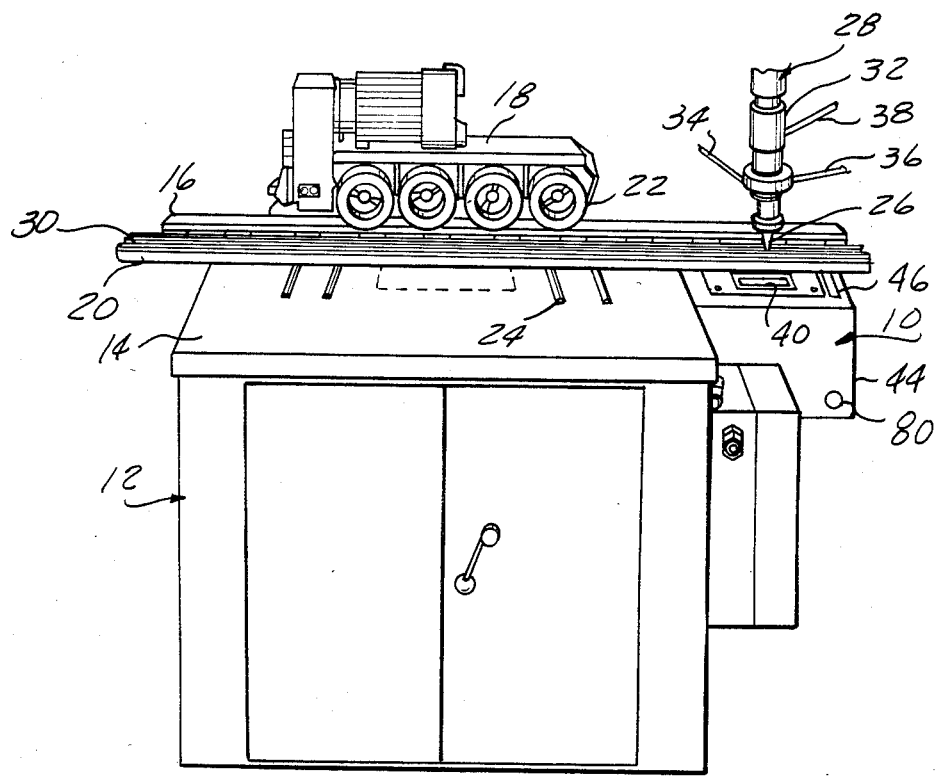
FIG. 1 is a front perspective of a filler carrier and nozzle of a plastic mixing and dispensing machine incorporating one example of the present invention in the form of a movable purging device.

Referring now to the drawings and, in particular, to FIG. 1, there is illustrated one example of the present invention in the form of a purging device 10 attached to a sidewall of a filler carrier 12. The filler carrier 12 is conventional in its construction and comprises a working table 14 which supports guide rollers 16 and motor driven extrusion feeder 18. An aluminum extrusion 20 is positioned horizontally on the top surface of the table 14 and is moved from left to right as viewed in FIG. 1 under the power of a plurality of drive rollers 22 that are driven at an adjustable feed rate by the feeder 18. The extrusion 20 is guided by the guide rollers 16 and adjustable clamping rollers (not shown) such that the extrusion 20 may be moved across the top surface of the table 14 along horizontal support rollers 24 at a rate of movement which is in timed relationship to the ejection of an uncured liquid plastic from a nozzle 26 of a plastic mixing and dispensing machine 28. During the operation uncured liquid plastic, such as a two-component urethane thermal barrier material, is ejected from nozzle 26 into a designated channel 30 formed generally along the mid-section of the aluminum extrusion 20.

After the aluminum extrusion 20 passes by the nozzle 26, the uncured plastic ejected into channel 30 cures in a relatively short time (for example, within ten seconds). Thereafter on a debridger (not shown) the aluminum extrusion 20 is passed by a cutting blade which cuts the aluminum extrusion 20 into two sections at a position adjacent the cured plastic so that the two sections of the aluminum extrusion 20 are now connected by the thermally insulated barrier, all of which is well known and conventional in the trade.

The filler carrier 12 and related debridger generally are well known in the trade and are commercially available through a number of manufacturers, such as the LeTarte Company, Inc., of Smith Creek, Mich.

The plastic mixing and dispensing machine 28 generally comprises a mixing section 32 wherein the components of the two-component urethane thermal barrier material are fed therein via conduits 34 and 36.

The components of the uncured plastic are mixed by well known motorizing means and are dispensed via the nozzle 26 into the designated channel 30 of the aluminum extrusion 20 as the same passes by the nozzle 26.

The dispensing machine 28 is provided with a source of pressurized air via conduit 38. As is well known in the industry, the uncured plastic materials are brought together in the chamber of the mixing section 32 and are then mixed therein and forced under pressure through the nozzle 26 for injection into the channel 30. As the aluminum extrusion 20 is fed through the filler carrier 12 and is filled with the appropriate plastic material, any amount of the plastic material which is ejected after an aluminum extrusion 20 has passed through the machine will be received in the opening 40 of the purging device 10.

As the last aluminum extrusion 20 has been filled with an appropriate amount of uncured plastic material, it is necessary that the dispensing machine 28 may remain operative so that the uncured plastic within the mixer and nozzle do not become cured. The excess and unused plastic material is continually dispensed directly into the opening 40 and will continue to be dispensed until the purging and solvent flush operation of the dispensing machine is completed, as will be described hereinafter.

Such plastic mixing and dispensing machines 28 are well known in the industry, and an example of such a machine which may be utilized in connection with the present invention, and as described herein, is manufactured by the Pyles Division of the Sealed Power Corp. of Wixom, Mich., and is marketed under trademark "Pyles 911 Rotary Duo-Flo". Since the filler carrier 12 and the plastic mixing and dispensing machine 28 described herein are conventional in construction and commercially available, a further detailed description thereof is not necessary.

Figure 2:
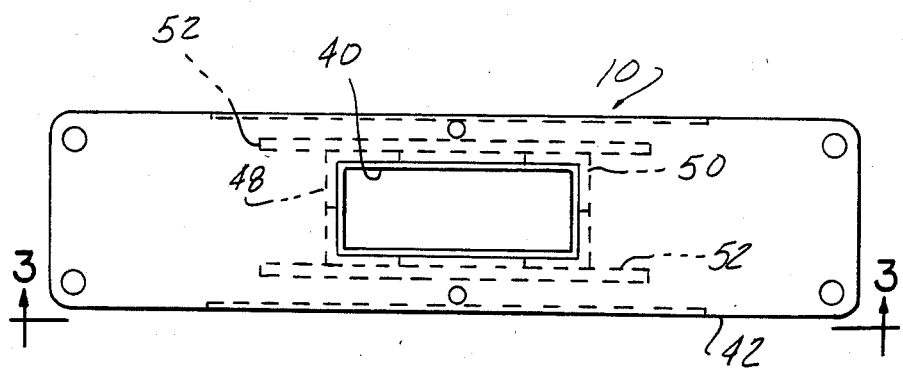
FIG. 2 is a fragmentary, top elevational view of the purging device illustrated in FIG. 1.
Figure 3:
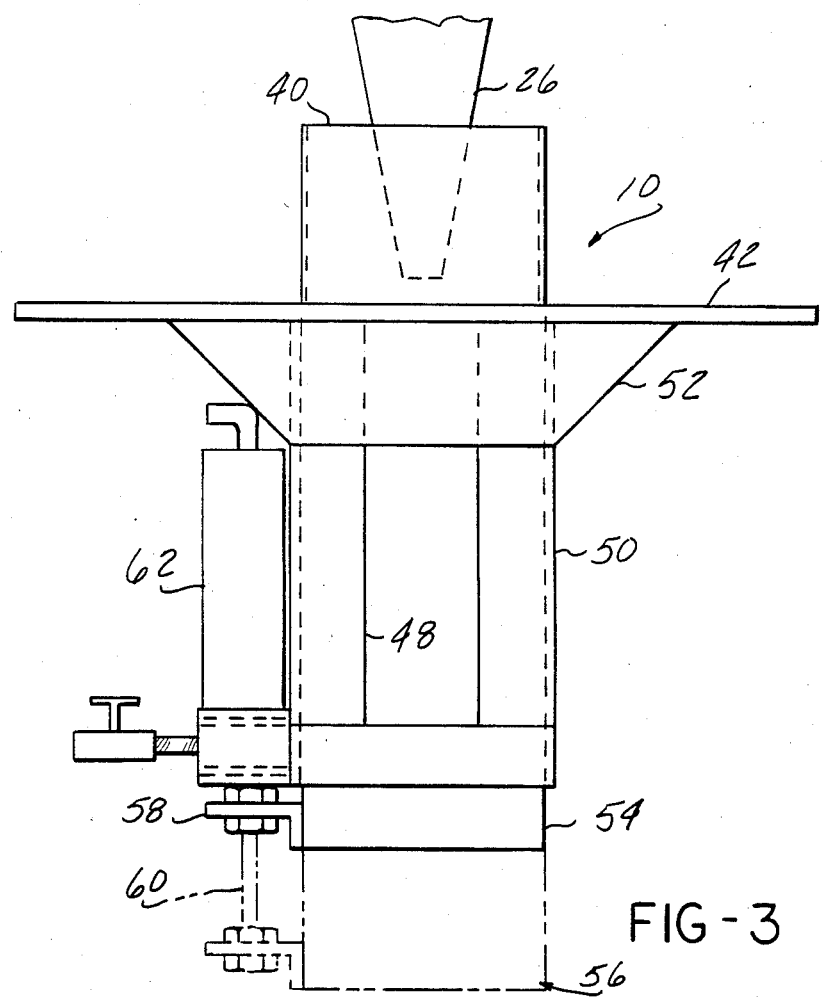
FIG. 3 is a cross-sectional view of the purging device as seen from line 3—3 of FIG. 2.

Referring now to FIGS. 1, 2 and 3 for a detailed description of the purging device 10, it can be seen that the same comprises a top support plate 42 which is secured to a housing 44 through any suitable fastening means (not shown). The housing 44 is, in turn, secured to the sidewall of the filler carrier 12. The top support plate 42 includes a support roller 46 that supports the extrusion 20 in a manner similar to the horizontal support rollers 24 as the extrusion 20 is moved beneath the nozzle 26.

The purging device housing 44 contains the moving elements of the purging device 10, as well as suitable means operable in response to appropriate actuation, such as mechanical, and fluid means of operation in response to mechanical, and fluid means of actuation, for illustrative purposes various fluid control valves and conduits, which will be described hereinafter in greater detail.

The purging device 10 includes a pair of opposing U-shaped channel members 48 and 50 which extend downwardly from the bottom surface of the support plate 42 and are secured thereto by flange members 52 by any suitable means, such as by welding or the like.

The opposing U-shaped channel members 48 and 50 define a vertical cavity within which is slidably mounted a complementary shaped conduit 54. The conduit 54 is movable between a lower position indicated in phantom lines at 56 wherein its upper surface defining the opening 40 is substantially flush with the top support plate 42 so as to permit the movement of the aluminum extrusion 20 thereover, to a second raised position illustrated in FIG. 3 wherein the nozzle 26 is received within the opening 40 of conduit 54.

The lower portion of the conduit 54 has an L-shaped flange 58 extending therefrom for attachment to the end of an actuating member, such as a piston rod 60, from a means operable upon actuation, for illustrative purposes a fluid cylinder 62 which is adapted upon actuation to extend and retract in a conventional manner so as to move the conduit 54 between its retracted lowered position 56 and its extended elevated position wherein it receives the end of the nozzle 26 as illustrated in FIG. 3.

Figure 4:
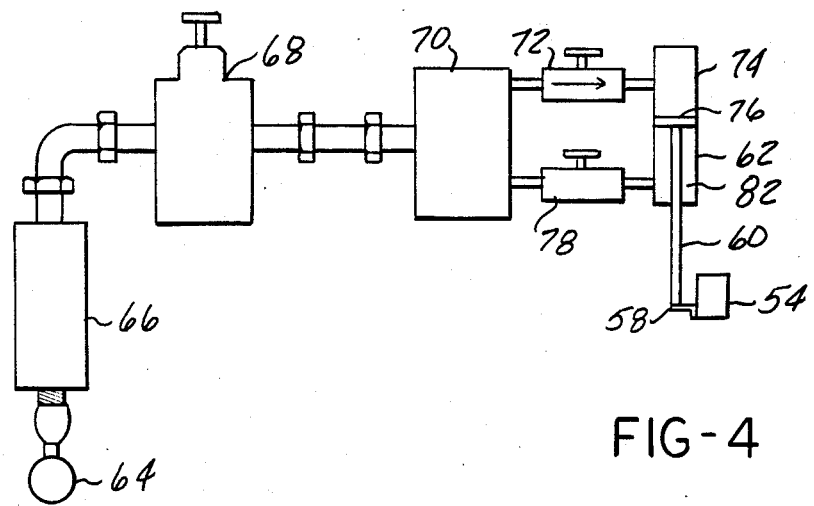
FIG. 4 is a schematic diagram of an example of meansoperable upon actuation, for illustrative purposes a fluid circuit which may be employed to operate the movable purging device illustrated in FIGS. 1-3 of the drawings.

Referring now to FIG. 4, there is illustrated an example of means operable upon actuation, namely a fluid circuit for controlling the movement of the conduit 54 between its lowered retracted position 56 and its extended nozzle engaging elevated position. The system employed is adapted to communicate fluid, such as compressed air under pressure, from a source 64 through a suitable check valve 66 and a pressure regulator 68 to a four-way valve 70. The four-way valve 70 is operable in a conventional manner to selectively communicate the fluid under pressure via flow control valve 72 to a pressure chamber 74 whereupon pressurized fluid acts against piston 76 to cause the piston rod 60 to be extended from the cylinder 62, thereby lowering the conduit 54 to its lowered position 56 (FIG. 3).

The four-way valve communicates fluid under pressure to the pressure chamber 74 continuously so as to maintain a positive force on the piston 76 to maintain the conduit 54 in its lowered position. When it is desired to raise the conduit 54, a suitable actuator control button 80 (FIG. 1) is actuated and four-way valve 70 is shifted so as to exhaust the pressure chamber 74 while pressurized fluid from the source 64 is communicated via flow control valve 78 to a cylinder pressure chamber 82. Pressurized fluid within the chamber 82 acts against the piston 76 to retract the piston rod 60 within the fluid cylinder 62 and thereby raise the conduit 54 to the position illustrated in FIG. 3 wherein the nozzle 26 is received therewithin.

The four-way valve 70 is operable to maintain fluid under pressure within chamber 82, thereby providing a constant force maintaining the conduit 54 in the elevated position until the operator purposely actuates the control button 80 (FIG. 1) so as to exhaust pressure chamber 82 and communicate the source of pressure 64 to the pressure chamber 74, thereby extending the piston rod 60 and moving the conduit 54 to its lowered position 56 (FIG. 3).

Referring now to FIGS. 1 and 4, as hereinbefore described, when the dispensing operation has been completed, the uncured liquid plastic continues to flow from the nozzle 26 and will be injected directly into the conduit opening 40 so as to prevent the possibility of the liquid plastic curing within the mixing section 32 of the dispensing machine 28. The operator will then actuate the control button 80 so as to cause four-way valve 70 to communicate fluid under pressure to the cylinder pressure chamber 82, causing a retraction of the piston rod 60 within the fluid cylinder 62 and thereby elevating the conduit 54 to the raised position illustrated in FIG. 3 to receive nozzle 26 within the conduit opening 40. At that time the operator then actuates the dispensing machine so as to terminate the flow of uncured liquid plastic to the mixing section 32. An appropriate solvent is then communicated to the mixing section so as to flush out the mixing section 32 and the nozzle 26. Upon termination of the solvent flushing mode, pressurized air is communicated to the mixing section 32 and any solvent and/or plastic material that remains within the mixing section 32 and nozzle 26 will be ejected through the nozzle 26 into the conduit 54. All of the material, including any uncured liquid plastic material, and all of the solvent will be communicated through conduit 54 to a suitable container positioned below housing 44 for storage and disposal at some convenient time.

After the flushing mode has been completed, the four-way control valve 70 is actuated by the control button 80 so as to communicate pressurized fluid to the pressure chamber 74 to expand piston rod 60 from the fluid cylinder 62. This action retracts the movable conduit 54 so that the filler carrier 12 is now in position to receive aluminum extrusions 20 and commence the process herebefore described.

It should be understood by those skilled in the field of filler carriers and associated mixing and dispensing machines that other forms of Applicant's invention may be had, all coming within the spirit of the invention and scope of the appended claims.

I claim:

1. In a filler carrier of the type for moving a metal extrusion in a generally horizontal plane beneath a dispensing nozzle for the dispensation of a liquid plastic material into a cavity formed in the metal extrusion so as to form a thermal barrier and wherein the nozzle is positioned above a fluid purging device over which the metal extrusion is horizontally displaced, the improvement comprising:
   a movable purging device, said purging device comprising a movable conduit having an upper and lower opening;
   support means for supporting said conduit for movement between a first lowered position wherein said upper opening is below a predetermined position which will permit horizontal displacement of said extrusion thereby and a second raised position wherein said conduit is elevated to receive said nozzle within said upper opening whereby fluid ejected from said nozzle is received into said conduit and exhausted from said lower opening; and
   means operable upon actuation for moving said conduit between said first and second positions.

2. The filler carrier defined in claim 1 further comprising:
   means slidably supporting said movable conduit, said means including first and second opposed flange members positioned around a portion of the outer surface of said conduit to slidingly support said conduit for movement between said first and second positions;
   said operable means comprising a fluid cylinder carried by said support means and having a piston rod extending from a lower portion thereof, said piston rod being coupled to the lower end of said conduit, said piston rod being retracted within said cylinder for raising said conduit to said second raised position, said piston rod being extended from said cylinder to move said conduit to said first lowered position.

3. The filler carrier defined in claim 1 comprising:
   a source of fluid pressure; and
   four-way valve means communicating fluid under pressure selectively to opposite sides of the piston within said cylinder to move said piston between said extended and retracted positions, said four-way valve being operable to continually communicate fluid under pressure to one or the other of said chambers so as to positively maintain said piston rod and thus said conduit in either said raised or lowered position.

* * * * *